United States Patent [19]

Wiebe

[11] E Patent Number: Re. 31,784

[45] Reissued Date of Patent: Jan. 1, 1985

[54] RAILWAY TRUCK BOLSTER FRICTION ASSEMBLY

[75] Inventor: Donald Wiebe, Sewickley, Pa.

[73] Assignee: A. Stucki Company, Pittsburgh, Pa.

[21] Appl. No.: 436,926

[22] Filed: Oct. 26, 1982

Related U.S. Patent Documents

Reissue of:

[64] Patent No.: 4,230,040
Issued: Oct. 28, 1980
Appl. No.: 953,012
Filed: Oct. 20, 1978

[30] Foreign Application Priority Data

May 25, 1979 [ZA] South Africa ..... 79/2557
May 28, 1979 [CA] Canada ..... 328479
Aug. 8, 1979 [AU] Australia ..... 49710/79

[51] Int. Cl.[3] ..... B60F 3/00
[52] U.S. Cl. ..... 105/197 DB; 105/197 D
[58] Field of Search ..... 105/197 A, 197 D, 197 DB, 105/224.1, 224 R, 197 AD; 267/9 R, 9 A, 9 B, 63 R, 140, 141; 280/716

[56] References Cited

U.S. PATENT DOCUMENTS

| | | | |
|---|---|---|---|
| 2,277,263 | 3/1942 | Tucker | 105/197 D |
| 2,333,921 | 11/1943 | Flesch | 105/197 D |
| 2,449,305 | 9/1948 | Lehrman | 105/197 D |
| 2,485,970 | 11/1949 | Lehrman | 105/197 D |
| 2,485,971 | 11/1949 | Light | 105/197 D |
| 2,485,972 | 11/1949 | Lehrman | 105/197 D |
| 2,516,072 | 7/1950 | Piron | 269/9 |
| 2,520,845 | 8/1950 | Lehrman | 105/197 D |
| 2,578,480 | 12/1951 | Lehrman | 105/197 D |
| 2,677,845 | 2/1954 | Maatman et al. | 105/197 D |
| 2,747,518 | 5/1956 | Campbell | 105/197 D |
| 2,747,519 | 5/1956 | Heater et al. | 105/197 D |
| 2,827,987 | 3/1958 | Williams | 188/251 |
| 2,908,232 | 10/1959 | Baselt | 105/197 D |
| 2,957,434 | 10/1960 | Baselt | 105/197 D |
| 4,109,934 | 8/1978 | Paton et al. | 217/9 B |
| 4,174,140 | 11/1979 | Bogar et al. | 105/199 C |

*Primary Examiner*—Richard A. Bertsch
*Attorney, Agent, or Firm*—E. Wallace Breisch; J. Stewart Brams

[57] ABSTRACT

A railway freight truck bolster friction assembly and more particularly improved friction assemblies of elastomeric material which are adapted to be captively retained intermediate an axial end portion of a bolster member and an adjacent side frame.

17 Claims, 10 Drawing Figures

RAILWAY TRUCK BOLSTER FRICTION ASSEMBLY

Matter enclosed in heavy brackets [ ] appears in the original patent but forms no part of this reissue specification; matter printed in italics indicates the additions made by reissue.

Modern three piece railway freight car trucks use rigid wedge shaped friction members intermediate an axial end portion of the bolster member and an adjacent side frame. These friction members provide the fit-up between the bolster and the side frame columns and serve to snub or damp the freight car suspension.

In the normal travel of railways cars over a railbed, various differences in the surface profile of the laterally spaced tracks resulting from rail joints and superelevation of the outside track on curves, gives rise to a tendency of resonant swaying and bouncing of the car body. In modern cars with heavy load capacity and a relatively high center of gravity, the forces and weight shift of the car resulting from track surface variations becomes so large at times that a variety of effects may develop such as:

(1) Complete unloading of the wheels on one side of the truck to the extent of lifting the unloaded wheels off the rail with a high potential of derailments;

(2) The imposition of extreme stresses on the car body and truck members; and (3) Cumulative damage and misalignment of track, ties and roadbeds through pounding action.

The need for adequate damping of railway vehicle suspensions has been recognized and to a certain extent alleviated by independent means. Specifically, as mentioned hereinabove, rigid friction members, for example as illustrated in U.S. Pat. No. 3,461,815 are generally utilized to dampen or snub the rocking motion by frictional resistance developed between the rigid friction members and the side frame column guides. In addition to the friction members highly successful hydraulic snubbers, such as shown in U.S. Pat. Nos. 4,004,525 and 3,868,912, which are vertically disposed in a spring group, have been developed and provide an even more effective means of snubbing the freight car swaying and bounce.

The utilization of rigid friction members for swaying has been shown to be defective in several areas. For example: the steel on steel frictional engagement between the rigid friction member and the side frame column guide wear plate results in a "stick-slip" friction action which produces poor ride quality. Furthermore, with an empty car the transmissability of the "stick-slip" friction can result in an excitation or coupling with any or all of the natural frequencies of the railway car components; and the "stick-slip" friction action results in an impacting type start and stop movement of the bolster with respect to the side frames thus leading to potential deleterious structural effect. Furthermore, the friction forces on the mating faces of the rigid friction member with respect to the side frame column guide and the bolster pockets may result in a requirement for frequent replacement of components and/or a renewal of wear surfaces. Still further, with higher friction forces of some rigid friction members the railway trucks occasionally have a tendency to sieze in a random lossenged angle (i.e., truck going out of square and the wheel flanges take an acute angle with respect to the guiding rail) thereby increasing unsymmetrical wheel flange and/or tread wear.

By use of the elastomeric friction member of the present invention the above problems are overcome, or in the least, greatly alleviated. Specifically, the elastomeric friction members deform initially before slipping with respect to the side frame column guide wear plate. Further, (just as a pencil eraser drawn across a rigid surface will initially deform, thereafter have portions slip while other mating portions deform and thereafter slip in its entirity) portions of the surface of the elastomeric friction member will slip while other portions will initially deform. Thus the transition of the elastomeric friction member from rest to movement will be smooth and controlled. With an elastomer, such as urethane there initially occurs motion without friction through the deformation of the elastomer and then the friction breaks for a very smooth transition. Furthermore, the relatively soft interface of the elastomeric friction member with respect to the rigid mating surfaces results in substantially less wear and failure due to loosening of column wear plates and of adjacent components and surfaces. Still further, the tendency to freeze in a loosenged attitude is substantially reduced with elastomeric friction members because of the characteristic shear flexibility of elastomers.

Thus by using elastomeric friction members, control of the various loaded and empty railway freight car motion modes is much superior than with the rigid friction members utilized heretofore. Furthermore, the function of spring group hydraulic snubber assemblies will complement the elastomeric friction members resulting in a more nearly linear spring motion response to all truck inputs with less total energy dissipation by the damping combination and less energy transmission to the car body in both loaded and empty operational modes. Still further, if desired, the hydraulic snubbers, which have been found to be operative to furnish more linear and optimum damping may be utilized as substantially the sole snubbing means and the elastomeric friction member will then serve the primary purpose of maintaining the bolster to side frame fit-up relationship. In this latter instance the force levels of the friction member with respect to the side frame column can be reduced to more optimum friction levels along with more optimum shear deformation constants.

An additional feature of the elastomeric friction members of the present invention is that they offer a controlled lateral restraint between the car body and truck which tends to increase the threshold primary hunting speed. The shear resilience of the elastomeric friction members is superior to the rigid friction members utilized heretofore. Hunting in railway vehicles is the unstable cyclic yawing of trucks and the resulting lateral oscillation of the railway car vehicle and is of particular significance when the car in traveling is an empty condition at relatively high speeds; for example, in excess of 40 miles per hour. The lateral track irregularities combined with conventional coned wheel configurations results in one side of a wheel set moving ahead of the other which in turn results in the flanges of the wheels striking and rubbing against the rails first on one side and then on the other thereby causing undesirable lateral body oscillations and excessive truck component and rail wear. As the wheel treads and flanges wear, the tread conicity becomes more severe and the flange-rail clearance becomes larger thereby resulting in even greater excursions of the wheel sets during hunting and hence a more severe response occurs at an even lower speed. The lateral excursions can become effectively severe to possibly result in derailments.

The inclusion of an elastmeric friction member of the present invention provides a controlled lateral constraint by increasing the lateral spring constant. The lateral spring constant of the elastomer is added to the lateral spring constant of the spring group, thus increasing the threshold hunting speed in much the same manner as the elastomeric bearing blocks of the side bearing in applicant's U.S. Pat. No. 4,080,016. For example, the resonance frequency due to hunting with rigid friction member may be 1½ to 2 hertz; however, the inclusion of the elastomeric friction members of the present invention may drive this resonance frequency to 2½ or 3 or even higher. Thus in some instances it may be possible to adequately control hunting by the elastomeric friction members of the present invention without the necessity of elastomeric bearing blocks being disposed within the side bearings. In the least the lateral spring constant provided by the elastomeric friction members will permit a wider range of choices as to the composition of the side bearing elastomeric bearing blocks.

A still further feature of the lateral constraint offered by the elastomeric shear resilience of the elastomeric friction members of the present invention is the elimination of the heretofore relatively free lateral bolster movement between the bolster gibs. This free movement resulted in the bolster gibs impacting with the side frame columns at the lateral motion limits. The bolster gib impact can cause additional response severity particularly in rocking loaded cars as well as hunting empty cars.

Accordingly, it is one object of this invention to provide a bolster to side frame friction assembly which provides smooth transition and damping characteristics.

Another object of this invention is to provide a superior means of fitting-up the side frame to bolster relationship.

Still another object of this invention is to provide a friction assembly which does not cause excessive wear to adjacent surfaces of the bolster and side frames.

Yet another object of this invention is to provide a side frame to bolster friction assembly which, in addition to serving heretofore "normal" functions of a friction member, additionally substantially raises the threshold hunting speed of a railway truck assembly.

These and other objects and advantages of the present invention will become more readily apparent upon a reading of the following description and drawings in which.

Figure 1:
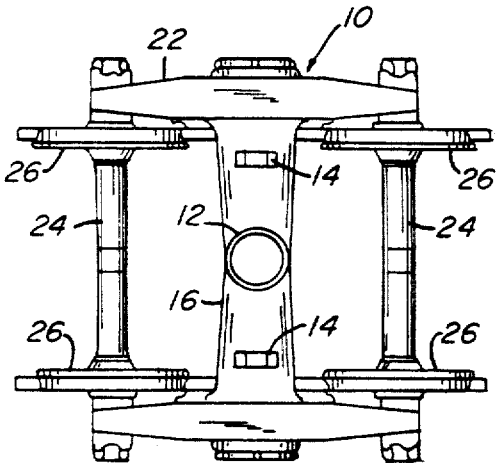
FIG. 1 is a schematic plan view of a conventional railway truck assembly of a type which will incorporate a load dependent friction snubbing assembly of the present invention therein.
Figure 3:
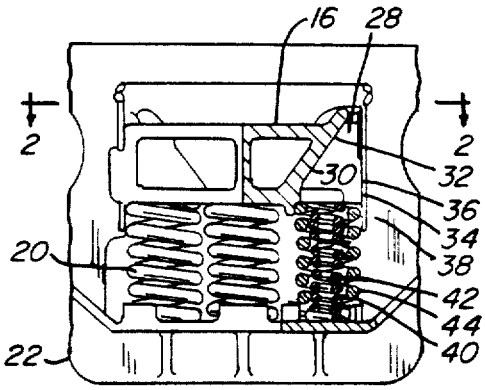
FIG. 3 is a fragmentary side elvational view, partially in section, of a bolster and side frame of a typical railway truck assembly which includes therein a load dependent friction wedge assembly of the prior art.
Figure 2:
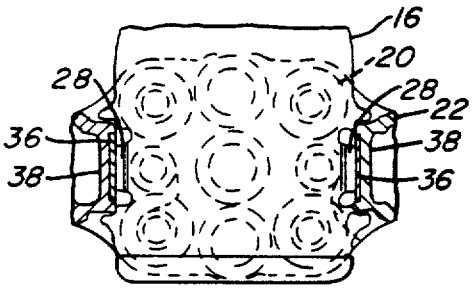
FIG. 2 is a fragmentary plan view taken on lines 2—2 of FIG. 3 which illustrates a typical spring group of a conventional railway truck assembly.

FIGS. 1, 2 and 3 illustrate a standard four wheel railway freight truck of a conventional design which is generally indicated at 10 and which comprises: bolster 16 extending transversely between a pair of laterally spaced side frames 22; spring groups 20 seated on each side frame 22 to support the bolster 16; and a centerplate 12 and suitable side bearings 14 which cooperate with the bolster 16 to support a carbody (not shown). A pair of spaced axle assemblies 24 having suitably journaled wheels 26 thereon extend in a direction generally parallel to the longitudinal extent of bolster 16 and support each side frame 22 adjacent respective axial end portions thereof and cooperate with a spaced pair of rails (not shown) for the rolling movement of the truck 10 therealong.

FIG. 3 is illustrative of a typical rigid friction wedge 28 of the prior art such as is shown in U.S. Pat. No. 3,461,815. Typically prior rigid friction wedges such as wedge 28 are generally triangular in cross-section with the hypotenuse mating with a similarly inclined surface 30 of a pocket 32 formed in axial end portions of the bolster 16. As shown there is a pair of transversely spaced rigid friction wedges 28 at each end of the bolster 16. The vertical surface 34 of each rigid wedge 28 is in biased engagement with a vertically extending wear plate 36 positioned on an adjacent column guide 38 of the side frames 22. This biased engagement is accomplished by pre-loading forces created by a spring coil unit 40; which includes inner and outer coils 42 and 44, respectively, extending vertically between the side frame 22 and an underside surface of the rigid friction wedge 28. Coil units 40 are generally considered a part of the spring group 20 with the balance of the coil units of spring group 20 communicating directly between the side frame 22 and the bolster 16.

As is known rigid friction wedges such as wedge 28 are utilized as an engagement means between the otherwise relatively loose bolster to side frame relationship of conventional trucks and which also serves as a limited damping means for a degree of rocking or swaying and bouncing control of the railway vehicle freight car truck 10. However, as is described hereinbefore, rigid friction wedges such as wedge 28 suffer from a variety of deficiencies such as: rigid stick-slip friction action which can result in excitation or coupling with the natural frequencies of railway car components and deleterious structural effects; substantial wear on mating surfaces; generally poor ride quality and a propensity to contribute to flange and wheel wear. Furthermore, wedges of the type illustrated in FIG. 3 are known to have but a limited effect on the hunting response of an empty freight car.

At this point it is to be noted that the invention herein is primarily directed to an improvement over the rigid bolster to side frame friction wedges utilized heretofore and the operation and cooperation of such improved arrangements with generally well known railway freight car components. Accordingly, other than is necessary to describe the various embodiments of the invention herein with respect to the bolster and side-frame relationships, the balance of the elements specified hereinabove need not be described in detail for a full and complete understanding of this invention to those skilled in the art. Furthermore, for purposes of description hereinafter, inner or inwardly and outer or outwardly shall respectively refer to towards and away from the longitudinal axis of the bolster 16.

Figure 4:
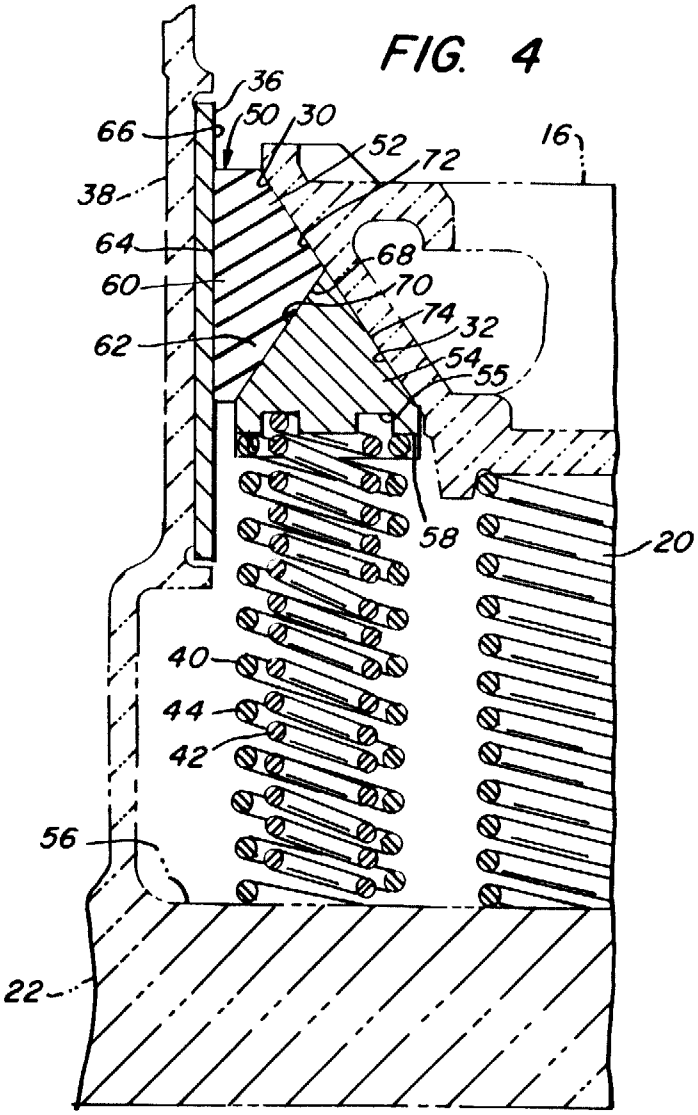
FIG. 4 is an enlarged partial side sectional view of a friction assembly of the present invention in operational position on a conventional railway truck assembly.

FIG. 4 illustrates a retrofit side frame to bolster friction assembly 50 of the present invention which is of a configuration which is adapted to be insertable within the bolster pocket 32 to replace prior art rigid friction wedges, such as wedge 28, without the need to alter the standard configuration of existing bolsters 16 and side frames 22 of the conventional freight car truck 10. Friction assembly 50 comprises: an elastomeric friction member 52 and spring follower 54 which is biased into engagement with member 52 by means of the coil unit 40 which extends vertically between an upwardly facing lower surface 56 of side frame 22 and downwardly facing lower surface 58 of follower 54. Follower 54 has a genrally upwardly extending triangular configuration and includes a downwardly open keeper pocket 55 formed within surface 58 for the captive retention of the upper end portion of coil unit 40. As viewed in FIG. 4 friction member 52 comprises an an inwardly projecting first portion, shown as formed triangular portion 62, and an outer second portion, illustrated as a generally rectangular portion 60.

With a general configuration as described above, when friction assembly 50 is biased into the operational position thereof by coil unit 40, the outer vertically extending surface 64 of portion 60 will be in biased engagement with the adjacent vertically extending surface 66 of the column guide wear plate 38 and the lower sloping surface 68 of triangular portion 62 will be in engagement with a complementary sloping surface 70 of follower 54. Furthermore, the upper sloping surface 72 of triangular portion 62 will be aligned in a common sloping plane with inner sloping surface 74 of follower 54 and the aligned surfaces 72 and 74 will be in continuous engagement with the adjacent inclined surface 30 of the bolster pocket 32. Thus, the elastomeric friction member 52 will be generally confined within the adjacent portions of the boundary surfaces 66, 30 and 70; however, the areas of portion 60 adjacent the upper and lower ends thereof will not be confined thereby allowing spaces for the member 52 to deform in shear.

The confined fit of the elastomeric friction member 52 within the bolster pocket 30 provides the fit-up of the side frame to bolster relationship. The pre-load provided by the upwardly directed biasing force of coil unit 40 provides the frictional force between the member 52 and the wear plate 36 interface which is necessary for vertical damping by friction assembly 50. The pre-load force on wedge shaped member 54 yields a transverse component reflected to and generating friction on the surface 68. This friction force may be varied by varying the spring constant of the coil unit 40 or by varying the "self-actuation angle". In the embodiment described, the self-actuation angle for upward motion of bolster 16 is the angle between surfaces 68 and 66 and for downward motion of bolster 16, the angle between surfaces 72 and 66. As the spring constant increases or the self-actuation angle decreases or becomes more acute the normal load on the wear plate surface 66 increases.

The normal force on the wear plate surface 66, in conjunction with the coefficient of friction between surfaces 64 and 66 determines the amount of external vertical force necessary to break friction between the wear plate 38 and the elastomeric friction member 52. Inasmuch as the damping from the vertical friction force to aid in the prevention of excessive rocking or bouncing conditions of the railway freight car 10 is dependent upon the biasing force of the friction assembly 50, it is important that the pre-determined force necessary to break friction not be so great as to prevent substantially all vertical movement of the bolster 16. Similarly, such pre-determined force must not be so small as to provide an insignificant damping effect.

Through the use of the friction assembly 50 of this invention, the damping of the vertical forces which would result in excessive rocking or swaying of the railway freight truck assembly 10 is accomplished in a smooth and controlled manner. Specifically, upon initial movement of the bolster 16 with respect to the sideframes 22, the elastomeric friction member 52 deforms vertically (see deformed member 52 as illustrated in the alternative embodiment of FIG. 7a). After this initial deformation, portions of the friction member 52 will continue deforming while other portions will slip with respect to the adjacent wear plate 36. Finally, friction will be entirely broken and the entire surface 64 of friction member 52 will slip with respect to the mating surface 66 of wear plate 38. Thus, the transition of friction member 52 from stationary to sliding is extrememly smooth and not at all like the abrupt "stick-slip" action of the prior art rigid friction wedges, such as the rigid friction wedge 28 discussed hereinbefore. Furthermore during the entire transition from preliminary partial deformation, deformation and partial sliding and complete sliding, the vertical motion of the bolster 10 with respect to the sideframes 22 is resisted by vertical bolster spring forces, including the coil units 40, and the damping or friction forces that occur during rocking or vertical bouncing. Still further, the physical properties of the elastomeric material of friction member 52 are such that the member 52 will not cause excessive wear, abrading or galling of the mating metallic surfaces.

An additional and very important feature of the side frame to bolster friction assembly 50 of the present invention is that it offers a controlled bolster to side frame restraint. This increases the threshold hunting speed and reduces the lateral bolster gib impact for both rocking and hunting control. Insofar as hunting control, the operation of the friction assembly 50 and the lateral deformation characteristics of the elastomeric friction members 52 will be similar to the general operation and deformation characteristics described heretofore with respect to the elastomeric bearing blocks in the side bearings in U.S. Pat. Nos. 3,957,318 and 4,090,750. The primary distinction between such patents and the present invention is that in such patents, the elastomeric side bearing blocks inhibit hunting by restraining the movement of the truck body with respect to the car body wherein in the present invention, the elastomeric friction members 52 act to control hunting by adding more restraint to the transverse or horizontal movement of the bolster 16 with respect to the side frames 22. Specifically, the elastomeric friction members 52 will deform in shear in a plane which extends in the longitudinal direction of the adjacent side frame 22 when the railway truck 10 is traveling at a high speed when there is a tendency for an empty car to hunt and the bolster to oscillate in a horizontal plane. The friction members 52 aid in the prevention of hunting by providing a sufficiently rigid shearing constraint at the bolster ends within a pre-determined acceptable modulus of elasticity while still maintaining the ability of the members 52 to provide the side frame to bolster fit-up effect and the vertical damping as discussed hereinbefore. The alternative embodiment best illustrated in FIG. 8a insofar as the deformation of the elastomeric friction member 52 during hunting control additionally includes a formed depression in the column guide wear plate to limit the lateral sliding of the member 52.

The hunting control qualities of the friction assembly 50 may be used in series with the hunting control aspects of the side bearings described in the above mentioned U.S. Pat. Nos. 3,957,318 and 4,090,750 or, if conditions so dictate, the hunting control can be accomplished primarily by the friction assembly 50 or by the friction assembly 50 in conjunction with the transverse force damping characteristics of the inclined snubber arrangement which is illustrated in U.S. Pat. No. 4,132,176. In such later instances, the requirement for elastomeric bearing blocks being disposed in the side bearings may no longer be necessary for adequate hunting control. In the former instance the utilization of a side bearing block constructed of two differing materials may no longer be required. In any event, the elastomeric material composition of the elastomeric friction member 52 will vary substantially (i.e. hardness characteristics, compression qualities, one or two material composition and the like) depending on the design effect desired and the synergism, if any, with other hunting control components of the railway freight truck 10.

Figure 5:
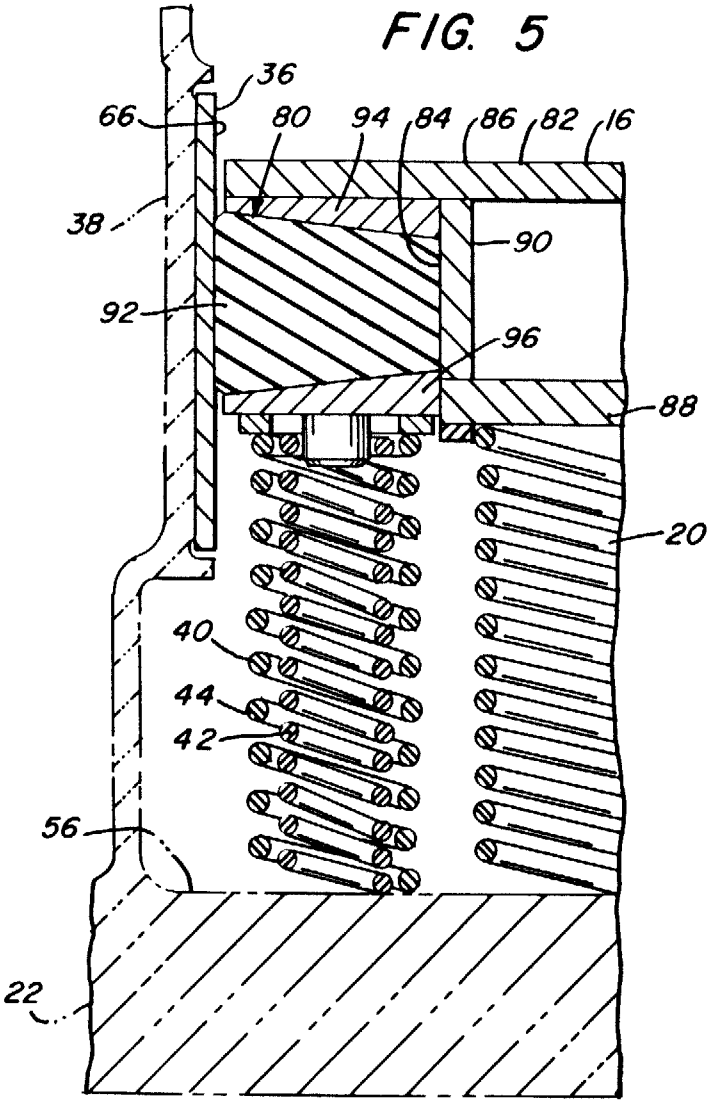
FIG. 5 is an enlarged partial side sectional view of another embodiment of a friction assembly of the present invention in operational position in a conventional railway truck assembly having modified bolster ends.

FIG. 5 illustrates another embodiment of a side frame to bolster friction assembly 80 of the present invention wherein the axial end portions 82 of a standard bolster 16 are custom designed to provide rectangular pockets 84 for captively receiving the friction assembly 80 therewithin. End portions 82 comprise: a top flange 86, having the outer end thereof spaced slightly inwardly from wear plate 36; a bottom flange 88 spaced downwardly from flange 86 and having the outer end thereof spaced inwardly with respect to the outer end of flange 86; and a web or wall portion 90 extending vertically between flanges 86 and 88 adjacent the outermost end of flange 88.

The bolster friction assembly 80 comprises: horizontally disposed elastomeric friction member 92 having the upper and lower sides thereof tapering inwardly from the outer ends thereof; a top keeper member 94 having a planar upperside surface thereof in communication with the underside surface of the top flange 86 and having a downwardly sloping underside surface which is in communication with an adjacent sloping side surface of friction member 92; and a lower follower member 96 having an upwardly sloping upperside surface which is in communication with an adjacent sloping side surface of friction member 92. The entire assembly 80 is provided with a pre-load or normal force by means of the coil unit 40 which communicates between the surface 56 of side frame 22 and the downwardly facing surface of lower follower member 96.

The operation and effect of friction assembly 80 is essentially the same as the fit-up, rocking and bouncing control, and hunting control as described hereinbefore with respect to friction assembly 50. The primary distinction between assemblies 80 and 50 are structural and the operational effects dictated by these structural distinctions. Specifically, the self-actuation angle of assembly 80 (as determined by the upper and lower sloping surfaces of friction member 92) is less acute with respect to the wear plate surface 66 then the self-actuation angle of assembly 50. Accordingly, the self-actuation force component normal to the wear plate surface 66 of assembly 80 for a given spring constant of coil unit 40, will be less than the self-actuation force component of assembly 50. However, it is to be noted that the degree of confinement of both elastomeric friction members resulting in a static confinement pressure on all faces surrounding the members is in addition to the self-actuation force or pressure component that occured with impending vertical motion. The selfactuation forces or pressure of assembly 80 will be less than assembly 50, assuming a similar composition elastomeric material used in each of the bearing members. The self-actuation pressure not only increases with a more acute angle but also with a softer durameter elastomer.

Figure 6:
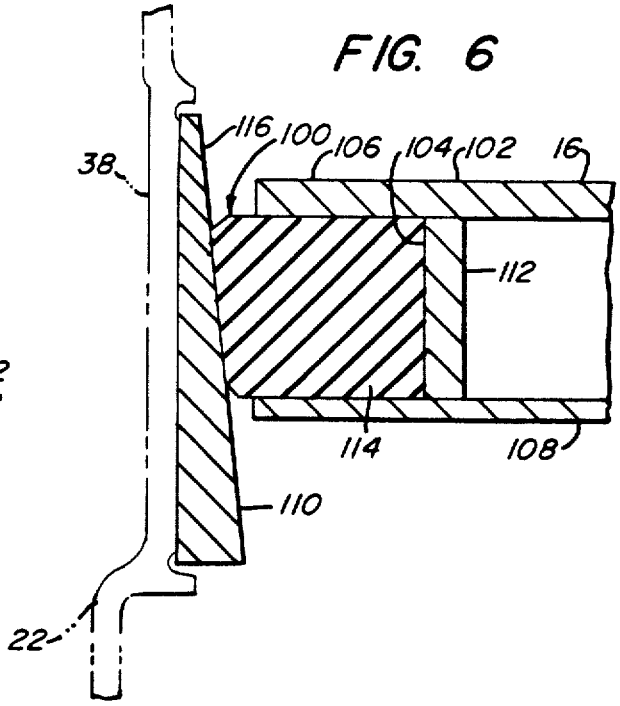
FIG. 6 is an enlarged partial side sectional view of yet another embodiment of a friction assembly of the present invention in operational position in a conventional railway truck assembly having modified bolster ends and wherein the friction assembly is operative without the necessity of a biasing or preloading spring.

FIG. 6 illustrates still another embodiment of a side frame to bolster friction assembly 100 of the present invention wherein the axial end portions 102 of a standard bolster 16 are custom designed to provide rectangular pockets 104 for captively receiving the friction assembly 100 therewithin. Furthermore, friction assembly 100 is operative without the necessity of a coil unit 40 and the normal force resulting in friction on the surface 116 is entirely the result of the lateral confinement surrounding the elastomeric friction member 114.

End portions 102 comprise: top and bottom vertically spaced flanges 106 and 108 respectively, which have outer ends thereof in a common vertical plane (or a slightly inwardly sloping plane, if desired), which plane is spaced slightly inwardly from the inner surface of the wear plate 110; and a web or wall portion 112 inwardly spaced from the outer ends of flanges 106 and 108 and extending vertically between flanges 106 and 108.

The side frame to bolster friction assembly 100 comprises a horizontally extending generally rectangular elastomeric friction member 114 having the outermost end thereof engaging the innermost surface 116 of the wear plate 110. Surface 116 slopes downwardly and inwardly from the uppermost end thereof and acts as a wedging force to compress the friction member 114 as the bolster 16 moves downwardly with respect to the side frames 22. This compression of friction member 114 by the increasing confinement of the wedging action created by the sloping surface 116 will result in a frictional restraint between the outer surface of member 114 and surface 116. This frictional restraint through the use of an elastomeric friction member will provide the operational advantages discussed hereinbefore with respect to the fit-up of the bolster to side frame relationship, hunting control and damping of rocking or bouncing of the railway freight truck 10.

An obvious advantage should design criteria dictate the usage of an assembly such as assembly 100 is that no coil units 40 are required to provide a pre-load force. In such an instance the special coil units 40 can be deleted and larger capacity bolster to side frame spring coils can be substituted therefor. The upward bias of the spring groups 20 will urge the bolster 16 upwardly after downward movement thereof and, because pockets 104 engage both the upper and lower surfaces of friction members 114, members 114 will return to the upper positions thereof upon upward movement of the bolster 16.

Figure 7:
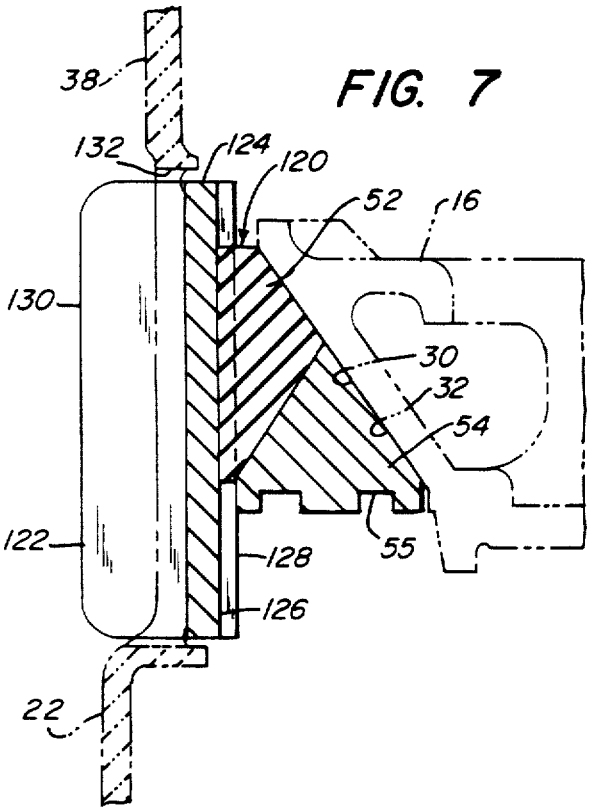
FIG. 7 is an enlarged partial side elvational view of still another embodiment of the present invention, similar to the embodiment of FIG. 4; however, including heat dissipation means and lateral captive restraints for the elastomeric friction member.
Figure 8:
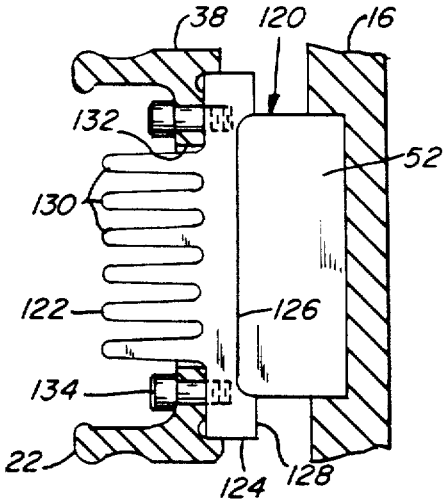
FIG. 8 is a plan view of the embodiment illustrated in FIG. 7.
Figure 8A:
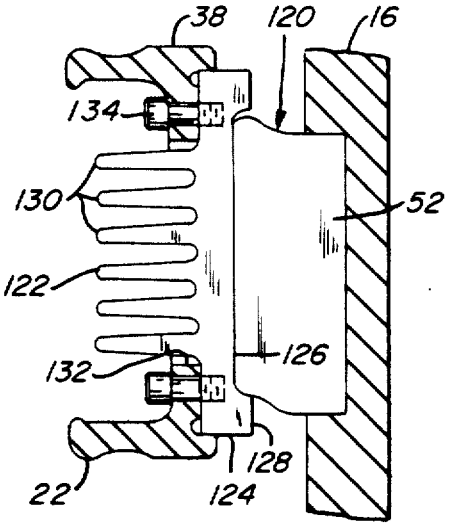
FIGS. 7a and 8a are views respectively similar to FIGS. 7 and 8; however, illustrating the deformed condition of the elastomeric friction member.
Figure 7A:
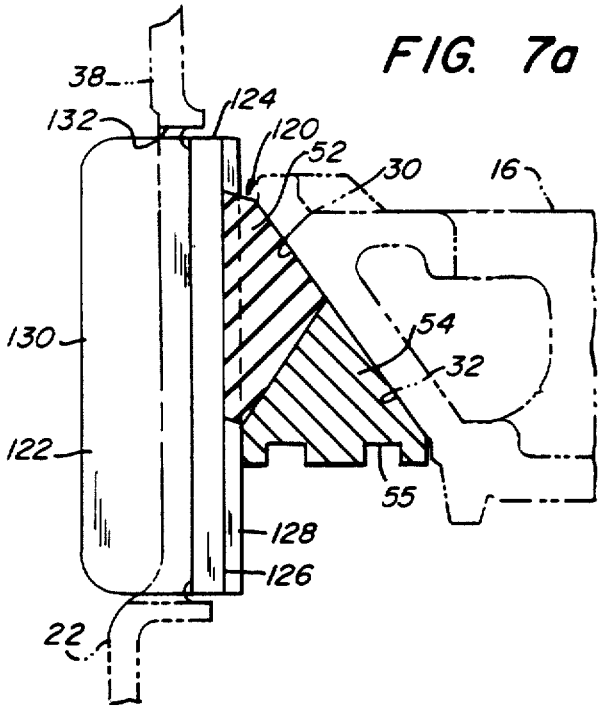

FIGS. 7 and 8 illustrate yet another embodiment of a side frame to bolster friction assembly 120 of the present investion which is substantially identical in construction and operation to the friction assembly 50 described hereinbefore with the primary distinction therebetween being that friction assembly 120 is operative in conjunction with a heat dissipation and wear surface means 122 which is carried by side frames 22 at the column guides 38 rather than the basic wear plate 36. FIGS. 7(a) and 8(a) illustrate the deformed condition of elastomeric friction member 52 as was discussed hereinbefore with reference to assembly 50.

Heat dissipation and wear surface means 122 comprises: a generally vertically extending plate portion 124; a continuous vertically extending guiding depression 126 on the inner surface 128 of the plate portion 124; and a plurality of transversely spaced vertically extending heat dissipation fins 130 which are integrally formed with portion 124 and extend outwardly from the outer surface thereof. A vertically extending formed opening 132 is provided through the side frame column guides 38 for the reception of the heat dissipation fins 130 therethrough when the means 126 is secured in operational position. As shown, in FIGS. 8 and 8(a), means 122 are releasably secured to column guides 38, such as by bolts 134 or the like, which communicate between guides 38 and plate portion 122 transversely outwardly adjacent the opening 132.

As is shown the balance of the elements of friction assembly 120 are essentially identical to the like numbered elements of assembly 50. Accordingly, the operation of assembly 120 will in most parts be identical to the operation described with respect to assembly 50 except for the heat dissipation afforded by means 122 and the lateral restraint provided by the depression 126. Insofar as the lateral restraint it is noted that the transverse dimension of depression 126 is substantially identical to the transverse dimension of the elastomeric friction member 52. Thus the hunting control offered by friction members 52 in assembly 120 is primarily through the deflection of the friction members 52. The depression 126 prevents the member 52 from sliding transversely with respect to the inner surace 128.

Insofar as the heat dissipation it is to be noted that the elastomeric material of friction member 52 is an inherently excellent heat insulator. Accordingly, the best build up at inner surface 128 may be substantial under certain operating circumstances; for example, 180° F. or more. Conditions may dictate that the elastomeric material of the friction member 52 adjacent the inner surface 58 be relatively stiff to resist wear and also to provide substantial shear deflection characteristics. As elastomeric material heats up substantially, the shear deflection characteristics may lessen or become uncontrolled. If design criteria dictates substantial shear deflection characteristics, such an uncontrolled change in these characteristics may be unacceptable. Accordingly, by providing the finned arrangement of means 122, the heat will be drawn from the inner surface 128 and dissipated to the surrounding atmosphere. Furthermore, simply by providing the opening 132 to releasably retain a wearing member, even one without heat dissipation fins 130, air can circulate closer to the inner surface and thus dissipate the heat build up which normally occurs thereat.

The invention herein is primarily directed to a side frame to bolster friction assembly having elastomeric friction means. Accordingly, various changes can be made by those skilled in the art to the embodiments described hereinabove without departing from the scope of the invention herein, which is defined by the scope of the claims hereinafter. For example: friction assembly 50, as well as other assemblies described herein, may be formed as a single elastomeric member rather than an independent elastomeric member 52 and a rigid follower 54; in all embodiments hydraulic snubbers can be disposed in the spring groups 20 to aid in the control of rocking or swaying of the railway freight truck 10; in all embodiments the elastomeric members may be formed with one or more differing layers of elastomer if conditions so dictate, the inner surfaces of the wear plates may be lubricated for initial break-in if desired; a guiding and keeper depression can be used in all embodiments if desired; the elastomeric portions of the friction member may be reduced if desired so long as sufficient shear constraint and deformation characteristics remain and that the interface at the column guide is an elastomeric material; and the like.

I claim:

1. A railway truck bolster friction assembly adapted to be [captively] retained within a pocket of an elongated truck bolster member which extends between spaced elongated side frame members of a railway truck vehicle comprising: elastomeric [friction] means adapted to have a first portion thereof in [communication] *engagement* with adjacent surfaces of such a pocket and a second portion thereof in frictional engagement with *an* adjacent [portions] *portion having a surface* of *a* wearing surface means of a column guide of a respective one of such side frame members[,]; said second portion being spaced [transversly] *transversely* outwardly, with respect to the longitudinal axis of such a bolster member, from such a pocket and said first portion extending [transversly] *transversely* inwardly from said second portion; and said elastomeric [friction] means being [operative to deform and] *deformable in shear to* maintain said frictional engagement, without slipping [between adjacent engaging surfaces], during [at least] initial vertical and transverse movements of such a bolster member with respect to such a respective one of such side frame members *until such deformation in shear reaches a given magnitude.*

2. A railway truck bolster friction assembly as specified in claim 1 additionally including biasing means to bias said elastomeric [friction] means into said [communication] *engagement with such adjacent surfaces of such a pocket* and said frictional engagement.

3. A railway truck bolster friction assembly as specified in claim 2 wherein during [a] subsequent [vertical movement] *relative movements* of such a bolster member *with respect to such a respective one of such side frame members* said elastomeric [friction ] means are operative such that at least sections of *said surface of* said second portion will slip with respect to *such* adjacent [portions] *portion* of such wearing surface means.

4. A railway truck bolster friction assembly as specified in claim [1] *2* additionally including said wearing surface means [of such respective one of such side frame members, and said adjacent portions of said wearing surface means extend] *extending* downwardly and [slope transversly] *sloping transversely* inwardly, with respect to the longitudinal axis of such bolster member, to be operative as said biasing means by providing a wedging action on said elastomeric bearing means as such a bolster member moves vertically *downward*.

5. A railway truck bolster friction assembly as specified in claim [2 additionally including said wearing surface means of such respective one of such side frame members, and said wearing surface means includes] *1 wherein* heat dissipation means [thereon which are operative] *are cooperable with said wearing surface means* to [directly] draw heat from said adjacent [portions] *portion* of said wearing surface means and dissipate such heat to the atmosphere.

6. A railway truck bolster friction assembly as specified in claim 2 wherein said biasing means continuously biases said elastomeric [friction] means into said [communication] *engagement with such adjacent surfaces of such a pocket* and said frictional engagement.

7. A railway truck bolster assembly as specified in claim 6 wherein *support means engage the downwardly facing portion of said elastomeric means and* said biasing means includes at least one elongated spring element extending substantially vertically intermediate said [elastomeric friction] *support* means and a generally horizontally extending spring seating portion of such a respective one of such side frame members, such seating portion being spaced downwardly from said [elastomeric friction] *support* means.

8. A railway truck bolster friction assembly as specified in claim 7 [additionally including] *wherein said support means is* a spring follower interposed vertically intermediate said elastomeric [friction] means and said spring element, said spring follower having[;] an underside surface thereof in [communication] *engagement* with an upper axial end portion of said spring element, an upperside surface thereof in engagement with an underside surface of said elastomeric [friction] means and having the [transversly] *transversely* innermost surface thereof, with respect to the longitudinal axis of such a bolster member, in [communication] *engagement* with *an* adjacent [surfaces] *surface* of such a pocket.

9. A railway truck bolster friction assembly as specified in claim 8 wherein said upperside and underside surfaces lay in a common plane, which plane slopes [upwardly as it extends transversly inwardly, with respect to the longitudinal axis of such a bolster member, from said second portion] *upwardly and towards said second portion from said underside surface of said elastomeric means.*

10. A railway truck bolster assembly as specified in claim 7 wherein [the underside surface of said elastomeric friction member slopes upwardly as it extends transversely inwardly, with respect to the longitudinal axis of such a bolster, from said second portion and is in communication with said biasing means,] said biasing means exerts a generally upwardly directed force on said elastomeric [friction] member and said frictional engagement primarily results from a horizontal component of said upwardly directed force [as applied at said underside surface].

11. In a railway truck assembly having an elongated bolster member which is supported adjacent the axial ends thereof on spring groups seated on spaced elongated said frame members and having bolster member friction assemblies positioned intermediate the bolster member and respective column guides of the side frame members, the improvement comprising: said friction assemblies each having elastomeric [friction] means received within a respective pocket of said bolster member, said elastomeric [friction] means having a first portion thereof in [communication] *engagement* with adjacent surfaces of said pocket and a second portion *having a surface* thereof in frictional engagement with a wearing surface means of said column guide, said second portion being spaced transversely outwardly, with respect to the longitudinal axis of said bolster member, from said pocket and said first portion extending [transversly] *transversely* inwardly from said second portion; and said elastomeric [friction] means being [operative to deform and] *deformable in shear to* maintain said frictional engagement, without slipping [between adjacent engaging surfaces,] during [at least] initial vertical and transverse movements of said bolster member with respect to said side frame members *until such deformation in shear reaches a given magnitude.*

12. A railway truck assembly as specified in claim 11 wherein during subsequent vertical movement of said bolster member said elastomeric [friction] means are operatie such that at least sections of said second portion will slip with respect to [adjacent portions of] said wearing surface means *until said deformation in shear reaches a given magnitude greater than said first mentioned given magnitude.*

*13. A railway truck bolster friction assembly adapted to be retained within a pocket of an elongated truck bolster member which extends between spaced elongated side frame members of a railway truck vehicle comprising: elastomeric means having a first portion with surfaces thereof adapted to frictionally engage adjacent surfaces of such a pocket and a second portion with a surface thereof adapted to frictionally engage an adjacent column guide surface of a respective one of such side frame members; said second portion being spaced transversely from said first portion such that when said surfaces of said first portion engage such adjacent surfaces of a pocket said second portion extends outwardly from the pocket; and said elastomeric means being deformable in shear to simultaneously frictionally engage such surfaces of a pocket at such a column guide surface engagements without slipping during initial relative movements of such a bolster member with respect to such a respective one of such side frame members until such deformation in shear reaches a given magnitude.*

*14. A device for maintaining engagement between a bolster and the side frames of a railway truck assembly in which an elongated bolster extends horizontally between spaced side frames with open ended pockets in the ends of the bolster being located in spaced adjacent relationship with surface means on the side frames, respectively, comprising:*

*a formed block of elastomeric material of a configuration to be received in such a bolster pocket with an outer surface of said block being in deformed engagement with an adjacent one of such a surface means when the bolster and the side frames are in a relative position which is the same as the relative position when said bolster and said side frames are at rest;*

*said elastomeric block being of a composition that, upon movement of the bolster relative to such adjacent one of such surface means to produce a shearing deformation in said block while said block remains in deformed engagement with such adjacent one of such surface means, said block initially remains in essentially the same relative position with respect to such*

*adjacent one of such surface means until such shearing deformation reaches a first magnitude and thereafter said block partially moves with respect to such adjacent one of such surface means until such shearing deformation reaches a second magnitude greater than said first magnitude and thereafter said block moves in its entirety with respect to such adjacent one of such surface means when the magnitude of such shearing deformation exceeds said second magnitude.*

*15. A railway truck assembly comprising: an elongated horizontally extending bolster; upstanding side frames at the ends of said bolster, respectively; open sided pockets in the ends of said bolster, respectively; said side frames having surface means adjacent the open sides of said pockets, respectively; elastomeric means in said pockets having outer surfaces in frictional engagement with said surface means, respectively; and said elastomeric means being of a composition that, upon movement of said bolster with respect to said surface means to produce a shear deformation in at least one of said elastomeric means, one said elastomeric means initially maintains such frictional engagement by undergoing shear deformation while remaining in essentially the same relative position with respect to the one of said surface means adjacent thereto until such deformation reaches a first magnitude and thereafter undergoing further shear deformation with only a portion thereof moving with respect to said one of said surface means until such deformation reaches a second magnitude greater than said first magnitude and undergoing still further shear deformation while moving in its entirety with respect to said one of said surface means when the magnitude of such shear deformation exceeds said second magnitude.*

*16. A railway truck assembly as specified in claim 15 wherein said frictional engagement results from initially deforming said elastomeric means prior to subjecting said elastomeric means to shear deformation.*

*17. A railway truck assembly as specified in claim 15 wherein biasing means carried by said side frames engages said elastomeric means, respectively, to bias said elastomeric means into said frictional engagement.*

* * * * *

UNITED STATES PATENT OFFICE

CERTIFICATE OF CORRECTION

Patent No. Re. 31,784 Dated January 1, 1985

Inventor(s) Wiebe

It is certified that error appears in the above-identified patent and that said Letters Patent are hereby corrected as shown below:

On the cover sheet, under the heading "Related U.S. Patent documents" the words "Patent No. 4,230,040" should read--Patent No. 4,230,047--

In claim 1, line 8, the words--having a surface--should appear in italics directly after "portion"; in lines 9 and 10, "having a surface" should be deleted.

In claim 4, line 9, the words "elastomeric bearing" should read--elastomeric [bearing]--.

In claim 7, line 1, the word--friction--should appear in italics directly after "bolster"; in lines 2 and 3, the words--an underside surface--should appear in italics in place of "the downwardly facing portion."

In claim 8, line 9, "an underside" should read--[an] said underside--with the word "said" appearing in italics.

In claim 10, line 8, the words "[friction] member" should read--[friction member] means--with the word "means" appearing in italics.

In claim 11, line 22, a comma should appear directly before "during"; in line 23, the words "vertical and transverse" should appear as--[vertical and transverse] relative--with the word "relative" appearing in italics.

UNITED STATES PATENT OFFICE
CERTIFICATE OF CORRECTION

Patent No. Re. 31, 784 Dated January 1, 1985

Inventor(s) Wiebe

It is certified that error appears in the above-identified patent and that said Letters Patent are hereby corrected as shown below:

In claim 12, line 4, "operatie" should be--operative--; also in line 4, the words--said surface of--should appear in italics directly before "said".

In claim 13, line 15, "at" should appear as--and--; line 16, "engagements" should be deleted.

In claim 15, line 11, "one said" should read--said one--.

In claim 16, line 2, "initially" should be deleted.

Signed and Sealed this

*Twenty-seventh* Day of *August 1985*

[SEAL]

*Attest:*

DONALD J. QUIGG

*Attesting Officer* *Acting Commissioner of Patents and Trademarks*